United States Patent [19]

Dunworth

[11] Patent Number: 5,096,865
[45] Date of Patent: Mar. 17, 1992

[54] HIGH DENSITY FUSED SILICA PROCESS AND PRODUCT

[75] Inventor: Bruce E. Dunworth, Tyler, Tex.

[73] Assignee: Ferro Corporation, Cleveland, Ohio

[21] Appl. No.: 479,402

[22] Filed: Feb. 13, 1990

[51] Int. Cl.$^5$ .................... C04B 35/02; C04B 35/14; C04B 35/16; C04B 35/20
[52] U.S. Cl. .................... 501/133; 501/94; 501/154; 106/636
[58] Field of Search ............ 501/122, 124, 128, 133, 501/154, 94, 122, 133, 154; 106/98, 636

[56] References Cited

U.S. PATENT DOCUMENTS

| | | | |
|---|---|---|---|
| 1,420,284 | 6/1922 | Rebuffat | 106/69 |
| 1,969,750 | 8/1934 | Heuer | 25/156 |
| 2,446,975 | 8/1948 | Conley | 106/69 |
| 2,573,264 | 10/1951 | Keltz | 106/63 |
| 2,838,409 | 6/1958 | Davies et al. | 106/69 |
| 3,189,337 | 6/1965 | North | 266/2.5 |
| 3,223,541 | 12/1965 | Lindenthal | 106/69 |
| 3,245,813 | 4/1966 | Lynam et al. | 106/69 |

FOREIGN PATENT DOCUMENTS

663774 12/1951 United Kingdom.
674240 6/1952 United Kingdom.

OTHER PUBLICATIONS

James S. Reed, "Introduction to the Principles of Ceramic Processing", 1988, pp. 185-197.
W. D. Kingery et al., "Introduction to Ceramics", 1976, pp. 9-12.

Primary Examiner—William R. Dixon, Jr.
Assistant Examiner—Michael A. Marcheschi
Attorney, Agent, or Firm—D. Peter Hochberg; Mark Kusner; Louis J. Weisz

[57] ABSTRACT

A method of forming high density silica products, and the products formed therefrom, comprising the steps of:
a) preparing a fused silica slip having a moisture content less than 25% by weight and fine silica particles of which about 90% are a size less than 55 microns;
b) mixing the fused silica slip with coarse silica particles having a gram size greater than Tyler Mesh -4 to form a mixture having between 20-70% coarse particles;
c) inserting the mixture into a mold of the product to be formed;
d) vibrating the mold for a predetermined period of time sufficient to settle the coarse silica particles in the mold and to facilitate release of air bubbles from the mixture and hardening the mixture by drying to form a molded piece.

11 Claims, No Drawings

HIGH DENSITY FUSED SILICA PROCESS AND PRODUCT

FIELD OF THE INVENTION

The present invention relates generally to refractory components for high temperature applications, and more particularly to components requiring high thermal shock and corrosion resistance. The present invention is particularly applicable to refractory components of rebonded fused silica and will be described with particular reference thereto, although it will be appreciated that the present invention finds advantageous application with other refractory materials.

BACKGROUND OF THE INVENTION

In the steel-making industry, refractory products, such as nozzles, liners, and the like, are subjected to severe thermal shock when molten metal first comes in contact with the surface of the refractory product. In addition to this thermal shock, molten metal, slag, and other impurities flowing over the surface of the refractory tends to abrade such surface. Consequently, it is desirable for the refractory component to have a high thermal shock resistance as well as a high resistance to corrosion and wear.

Rebonded fused silica products have seen wide use in such applications, i.e. where high thermal shock resistance and wear resistance are main requirements. Such products are typically formed of fused silica particles by means of a casting process. In this respect, the silica particles are mixed with water to form a slurry (conventionally referred to as a "slip") which may be cast in plaster molds having the shape of the components to be formed. A characteristic of products formed in this manner is an inherent porosity which while enhancing the product's thermal shock resistant properties reduces it corrosion and wear resistance. The porosity of such products is affected by the size of the particle used, as well as the amount of moisture contained in the silica slip. More specifically, because moisture is necessary to form the silica slip, porosity inevitably exists in every cast product as a result of the evacuation of the moisture during the casting process. With respect to the particle size, generally, the larger the particle used in forming the product, the greater the porosity of the resulting product and, in turn, the lower the corrosion resistance. Consequently, most products formed heretofore were generally formed from silica particles having grain size less than a millimeter, and these products generally exhibited a 10% or more porosity and a density of approximately 1.90-1.95 grams per cubic centimeter, which characteristics resulted from the particle size and moisture content of the casting material.

The present invention provides a refractory product having a relatively high density and low porosity which has improved thermal shock resistance, as well as improved resistance to corrosion and/or erosion.

SUMMARY OF THE INVENTION

In accordance with the present invention there is provided a method for forming a high-density silica product comprising the steps of:

a) preparing a fused silica slip having a moisture content less than 25% by weight and including fine silica particles of which about 90% are sized less than 55 microns;

b) mixing the fused silica slip with coarse silica particles having a grain size greater than a Tyler standard screen having a mesh designation of 4 mesh (0.185 inch opening) to form a mixture having between 20-70% coarse particles;

c) inserting the mixture into a mold of the product to be formed;

d) vibrating the mold for a predetermined period of times sufficient to settle the coarse particles in the mold and to facilitate release of air bubbles from the mixture; and, e) hardening the mixture by drying to form a molded piece.

More specifically, the present invention pertains to improvements in forming rebonded fused silica products characterized by the use of increased grain sizes and a modified casting technique which enables use of such large grain sizes. In this respect, wherein conventionally-known nozzles have generally utilized silica particles sized 1 millimeter or smaller, the present invention utilizes silica particles up to approximately 8 millimeters in size. As set forth above, a fused silica slip having a predetermined moisture content is formed from fine silica particles. Importantly, the slip is prepared to have a consistency, which when mixed with the coarse silica particles in a mixing drum essentially coats and adheres to each coarse silica particle. The slip-coated coarse silica particles are then poured into a mold of the product to be formed. Importantly, the mold is vibrated for a predetermined period of time wherein the coarse silica particles and the coating thereon settle into a close-packed array with the thick slip coating filling the interstices between the coarse silica particles. In addition, the vibration facilitates release of air bubbles from the casting. The vibration thus provides a denser, less porous resulting product. Importantly, it would be expected that the denser material would reduce the thermal shock resistance of the resulting product. However, the large coarse silica particles actually provide a more shock-resistant product than products of comparable density which utilize smaller-grain-size silica particles. In this respect, the present invention utilizes silica particles which are believed to be at least eight times larger than particles known heretofore in conventional products of rebonded fused silica. As will be appreciated, the increase in density also provides a product having increased corrosion resistance.

In accordance with another aspect of the present invention there is provided a castable silica mixture to be used in casting refractory products for use where abrasion and high thermal shock are encountered. The mixture is comprised of silica solids and water, blended on a weight percentage basis of: about 20-70% coarse silica particles which will pass through a Tyler standard screen having a mesh designation of 4 mesh (0.185 inch opening) and not pass through a 100 mesh screen (0.0058 inch opening), about 3-8% fine silica particles having a grain size less than 2 microns, about 15-40% fine silica particles having a grain size less than 12 microns, about 12-32% fine silica particles having a grain size less than 55 microns, and a moisture content of less than 16%.

In accordance with another aspect of the present invention there is provided a rebonded fused silica product comprised of silica solids on a weight percentage basis of: about 20-70% coarse silica particles having a size between Tyler Mesh −4 and +100 (i.e. less than 0.185 inch opening but greater than 0.0058 inch opening), about 3–8% fine silica particles having a grain size less than 2 microns, about 15–40% fine silica particles having a grain size less than 12 microns, and about 12–32% fine silica particles having a grain size less than 55 microns.

It is an object of the present invention to provide an improved method of molding and forming castable refractory products for use where abrasion and high thermal shock are encountered.

Another object of the present invention is to provide a method as described above characterized by utilization of grain sizing coupled with a modified casting technique.

Another object of the present invention is to provide rebonded fused silica products having increased bulk density and a corresponding decrease in porosity.

Another object of the present invention is to provide a product as defined above characterized by an increase in thermal shock resistance as well as an increase in corrosion resistance.

A still further object of the present invention is to provide a product as defined above which utilizes silica particles having a grain size greater than one millimeter.

These and other objects and advantages of the invention will become apparent from the following description.

DETAILED DESCRIPTION OF PREFERRED EMBODIMENT

High density rebonded fused silica products according to the present invention are produced by utilizing a predetermined silica mixture as well as a process adopted to improve the physical properties of the product. In general, the present invention involves preparing a fused silica slip having predetermined characteristics, mixing such slip with coarse fused silica particles to form a mixture, and casting such mixture.

Referring now to the formation of a fused silica slip, in accordance with the present invention, slip is prepared by grinding fused silica grains and water in a ball mill. The initial fused silica grain may be coarse to fine, for example a particle which will pass through a Tyler standard screen having a mesh designation of 4 mesh (0.185 inch opening) and not pass through a 100 mesh screen (0.0058 inch opening). As used hereinafter, Tyler Mesh +4 means a grain size greater than Tyler Mesh 4, i.e. greater than 0.185 inches. Tyler Mesh −4 +100 means a grain size less than Tyler Mesh 4 and greater than Tyler Mesh 100, i.e. 0.0058 inches. A number of sizes are readily available on the market. According to the present invention, the slip is ground until approximately 50% of the fused silica grain has been reduced to approximately 10 microns or less. Preferably, the resulting slip has a particle size distribution wherein approximately 10% of the slip particles have a grain size less than 2.00 microns but not smaller than about 1.25 microns. 50% of the slip particles have a grain size less than 12.00 microns, but not smaller than about 8.00 microns, and 90% of the slip particles have a grain size less than 55.00 microns, but not smaller than 35.00 microns. (The sizes of the respective particles sizes have been measured and determined by a MICROTRAC® measuring device which is conventionally known in the art. Measurements obtained using other measuring devices may vary slightly from those set forth above). Thus, the slip generally contains three types of particles: fine particles having a grain size less than 55 microns, very fine particles having a grain size less than 12 microns, and extremely fine particles having a grain size less than 2 microns. The slip created preferably has a water content of less than 25% and optimally between 15–20%.

The slip is then transferred to a mixing device, such as a cement mixer, and coarse fused silica grain is added thereto. According to the present invention, the size of the coarse silica grain may be one of many commercially available sizes such as Tyler Mesh −4 +100 (i.e. less than 0.185 inch opening but greater than 0.0058 inch opening), Tyler Mesh −6 +48 (i.e. less than 0.131 inch opening but greater than 0.0116 inch opening), Tyler Mesh −20 +48 (i.e. less than 0.0328 inch opening but greater than 0.0116 inch opening). A preferred range of coarse particle size is −4 +10 (i.e. less than 0.185 inch opening but greater than 0.065 inch opening). A preferred ratio of coarse grain to slip would fall within the range of 60% coarse grain/40% slip to 50% coarse grain/50% slip. In this respect, it will be appreciated that the ratio of coarse particle size to slip is dependent upon the size of the coarse particle used in the mixture. Larger particles would generally require a greater amount of slip to fill the larger interstices formed therebetween, vice versa, the smaller the coarse silica particle, the smaller the interstices formed therebetween and the lesser the percentage of slip required. A permissible ratio of coarse grain to slip would fall within the range of 20% coarse grain/80% slip to 70% coarse grain/30% slip. The mixture of slip and coarse silica particles are preferably thoroughly mixed to produce a thick slurry mixture. Importantly, the mixing of the coarse fused grains with the slip facilitates a thorough coating of the slip on each coarse silica particle.

The slurry is then poured into plaster molds having a forming cavity dimensioned to define the shape of the desired article. An important aspect of the present invention is that the coarse grains settle as much as possible into a dense, closely-packed array. To this end, the molds are vibrated for a predetermined period of time with a pneumatic or electric vibrating device to enhance settling of the large grains within the mold. Importantly, vibration of the mold also improves the release of air bubbles, thus improving the internal structure of the fused silica shape. The molding die is preferably designed to receive sufficient slurry to ensure that when the settling of the coarse particles is completed, the desired molded product has a uniform density therethrough and that no separation (i.e. of the coarse particles and slip) is produced in the upper portion of the molded product. In other words, the molded product may include an upper portion to accommodate settling of the coarse particle in the slip, which portion is to be removed from the final product.

Casting is preferably done in plaster molds as is conventionally known. The high-density shapes are then removed from the molds after the cast product has been allowed to dry. The resultant structure is characterized by densely-packed coarse grain particles with a minimum amount of very fine particles filling the interstices between the coarse silica particles. The three sizes of fine silica particles in the slip provide the appropriate grain sizing to fill the various sized voids or interstices found between the coarse particles. This sizing of the particles together with the vibration of the mold ensures that the fine slip particles fill the interstices between the coarse particles. Because of the forced settling during casting, the structure is generally homogeneous throughout the shape, even if shaped as a long tube. Importantly, this method of forming a nozzle is generally contrary to that considered a standard slip casting practice wherein methods are used to avoid or reduce settling as much as possible.

After casting, the molded shape is removed from the mold, dried and fired at a high enough temperature to sinter the coarse and fine fused silica particles, but not so high as to crystallize the fused silica particles. According to the present invention, this firing temperature is preferably between approximately 2050° F. and 2100° F.

A product formed by the aforementioned process would generally provide a rebonded fused silica product comprised of silica solids on a weight percentage basis of about 20-70% coarse silica particles having a Tyler Mesh size −4+100 (i.e. less than 0.185 inch opening but greater than 0.0058 inch opening), about 3-8% fine silica particles having a grain size less than 2 microns, about 15-40% fine silica particles having a grain size less than 12 microns, and about 12-32% fine silica particles having a grain size less than 55 microns. Importantly, the coarse silica particles substantially increase the thermal shock resistance of the device as compared to smaller particles.

The following are specific examples of slip/coarse particle mixtures for forming products according to the present invention.

EXAMPLE 1

A fused silica slip of 18% moisture and a particle size distribution by MICROTRAC® of 10% less than 2.0 microns; 50% less than 12.0 microns and 90% less than 48 microns is produced by grinding 150 pounds of Tyler Mesh −4+10 (i.e. less than 0.185 inch opening but greater than 0.065 inch opening) fused silica grain and 33 pounds of water in a ball mill.

To 50 pounds of this slip is added 50 pounds of Tyler Mesh −4+10 (i.e. less than 0.185 inch opening but greater than 0.065 inch opening) fused silica grain in a cement mixer and mixed for one minute. The resulting slurry is poured into a vibrating mold. After three minutes, the vibrator is removed and casting is allowed to continue to completion. The shape produced is a 36" long tube with an O.D. of 5.5" and an I.D. of 2.75". The tube is further processed as in the description above.

EXAMPLE 2

A fused silica slip of 17.5% moisture is produced by grinding together 150 pounds of Tyler Mesh −10+20 (i.e. less than 0.065 inch opening but greater than 0.0328 inch opening) fused silica grain and 30 pounds of water. To 40 pounds of this slip is added 60 pounds of Tyler Mesh −6+48 (i.e. less than 0.131 inch opening but greater than 0.0116 inch opening) fused silica grain in a cement mixer. After one minute of mixing the slurry is poured into a vibrating mold. Vibration is continued for 1.5 minutes, the vibrator removed, and casting allowed to proceed to completion. The shape is removed from the plaster mold and processed as in the above description.

The following table shows a comparison between products formed by Examples 1 and 2 and similar products formed by conventionally known slip casting of silica particles having fine grain size, and by injection molding of silica particles.

|  | Fine Grain | Injected | Example #1 | Example #2 |
| --- | --- | --- | --- | --- |
| Bulk Density g/cc | 1.91 | 1.91 | 2.00 | 2.04 |
| Appl Porosity % | 10.89 | 10.34 | 7.57 | 5.36 |
| Mod. of Rupt. psi | 2987 | 1925 | 2458 | 3921 |
| Ult. Velocity m/s | 4350 | 4909 | 4650 | 5170 |

The table compares the bulk density, the porosity, the modulus of rupture, and ultrasonic frequency for the respective products. As can be seen from the table, products made according to the present invention as shown by Example 1 and 2 show an increase the bulk density and a significant reduction in porosity. These characteristics indicate a denser product having greater corrosion resistance as compared to the other products. More importantly, the modulus of rupture and ultrasonic frequency of Example 2 show an increase which indicates an increase in thermal shock resistance. As will be appreciated from the difference in the formulation between Example 1 and 2, numerous combinations of particle sizing in the slip as well as the coarse particle size are possible and will vary the resultant density, porosity and modulus of rupture of the resultant piece. Importantly, it is the utilization of relatively large silica particle grains which are of a magnitude of 8 or more times larger than those used heretofore, as well as the method of casting such coarse silica particles, which provide the advantageous characteristics of the resulting product. In this respect, variations and modifications of the formulation described will occur to others upon a reading and understanding of this specification. It is intended that all such modifications and alterations be included in so far as they come within the scope of the appended claims or the equivalence thereof.

Having thus described the invention, the following is claimed:

1. A rebonded fused silica product formed by the steps of:
   a) preparing a fused silica slip comprised of said fine silica particles and water, said slip having a moisture content less than 25% by weight,
   b) mixing said fused silica slip with said coarse silica particles to form a mixture,
   c) inserting said mixture into a mold of said product,
   d) vibrating said mold for a period of time sufficient to settle said coarse silica particles in said mold and to facilitate release of air bubbles from said mixture, and
   e) hardening said mixture by drying to form a molded piece.

2. A rebonded fused silica product formed from an aqueous slurry mixture that has been settled by vibration comprised of silica solids on a weight percentage basis of:
   about 20-70% coarse silica particles having a size of Tyler Mesh −4+100,
   about 3-8% fine silica particles having a grain size less than 2 microns,
   about 15-40% fine silica particles having a grain size less than 12 microns,
   about 12-32% fine silica particles having a grain size less than 55 microns; and,
   a moisture content less than 16%.

3. A product as defined in claim 2 further characterized by a modulus of rupture exceeding 3000 psi.

4. A product as defined in claim 2 further characterized by a bulk density equal to or greater than 2 grams per cubic centimeter.

5. A product as defined in claim 2 further characterized by a porosity of less than 9%.

6. A product as defined in claim 1 including the step of:
  f) firing said molded piece for a period of time sufficient to sinter the coarse and fine silica particles, but not so high as to crystallize the silica particles.

7. A product as defined in claim 6 wherein said firing as carried out at a temperature between approximately 2050° F. and 2150° F.

8. A high-density silica product of fused silica particles formed by the steps of:
  a) preparing a fused silica slip having a moisture content less than 25% by weight and fine silica particles of which about 90% are sized less than 55 microns,
  b) mixing said fused silica slip with coarse silica particles having an aqueous slurry grain size greater than Tyler Mesh −4 to form a mixture having between 20–70% coarse particles.
  c) inserting said mixture into a mold of said product to be formed,
  d) vibrating said mold for a predetermined period of time sufficient to settle said coarse silica particles in said mold and to facilitate release of air bubbles from said mixture, and,
  e) hardening said mixture by drying to form a molded piece.

9. A product as defined in claim 8 further including the step of:
  f) firing said molded piece for a period of time sufficient to sinter the coarse and fine silica particles, but not so high as to crystallize the silica particles.

10. A product as defined in claim 1 wherein said slip has a moisture content of at least 15%.

11. A product as defined in claim 8 wherein said slip has a moisture content of at least 15%.

* * * * *